Figure 1:
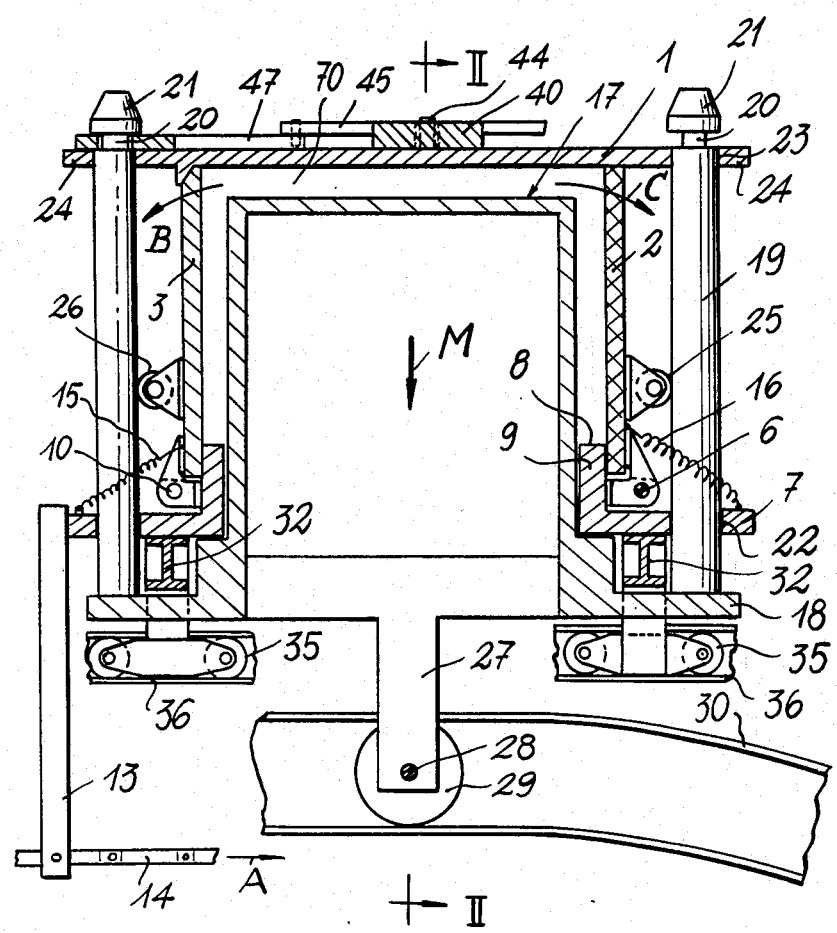

United States Patent [19]
Valentini

[11] 3,877,856
[45] Apr. 15, 1975

[54] MOLD FOR HOLDING CONTAINER SHELLS DURING INTRODUCTION OF INSULATION THEREBETWEEN

[76] Inventor: Mario Valentini, Via Cappuccini 38, Gallarate, Italy

[22] Filed: Nov. 17, 1972

[21] Appl. No.: 304,589

[30] Foreign Application Priority Data
Apr. 13, 1972 Italy .................................. 23098/72

[52] U.S. Cl. ................................ 425/110; 249/144
[51] Int. Cl. ............................................... B29f 1/06
[58] Field of Search ............ 249/144, 142, 147–149, 249/151, 170–172; 425/123, 126, 129, 117, 121, 125, 110

[56] References Cited
UNITED STATES PATENTS

| | | | |
|---|---|---|---|
| 826,599 | 7/1906 | Normandin | 249/151 X |
| 3,136,024 | 6/1964 | Monica | 249/144 X |
| 3,217,356 | 11/1965 | Stutsman | 249/142 X |
| 3,241,210 | 3/1966 | Shurtz | 249/172 X |
| 3,408,695 | 11/1968 | Scott | 249/170 |
| 3,543,335 | 12/1970 | Meyer | 425/454 X |
| 3,642,398 | 2/1972 | Rudgisch | 425/117 |
| 3,712,771 | 1/1973 | White | 425/126 |
| 3,752,437 | 8/1973 | Saidla | 249/172 |
| 3,771,928 | 11/1973 | Gostyn | 425/4 R |

Primary Examiner—Francis S. Husar
Assistant Examiner—John S. Brown
Attorney, Agent, or Firm—Steinberg & Blake

[57] ABSTRACT

A mold for holding a pair of container shells while an insulating foam plastic is introduced therebetween. A plate is formed with an opening for receiving an inner mold member received in the inner shell while the plate carries an outer mold assembly which receives the outer shell and which is made up of walls which are swingable with respect to the plate between an open position releasing the shells and the plastic therebetween and a closed position enclosing the outer shell to retain the latter properly positioned with respect to the inner shell. The plate is moved along a predetermined path and the inner mold member moves therewith while being guided for movement through the plate opening between an outer release position and an inner molding position. The inner mold member carries a structure which automatically swings the walls of the outer mold assembly to their closed position when the inner mold member is guided for movement through the plate opening to its inner molding position.

6 Claims, 3 Drawing Figures

MOLD FOR HOLDING CONTAINER SHELLS DURING INTRODUCTION OF INSULATION THEREBETWEEN

This invention relates to an articulated mold for holding inner and outer container shells while a foam plastic such as polyurethane is received therebetween, the invention being particularly suitable in the manufacture of refrigerators and freezers.

It is known that refrigerators and freezers comprise a cabinet formed of outer and inner shells between which insulating material is placed, this insulating material being, for example, polyurethane made to expand in situ. The introduction of the ingredients or components, by the reaction of which the foamed polyurethane is produced, occurs when the refrigerator, and more particularly its inner and outer shells as more or less temporarily combined with each other, are placed in a mold comprising a male mold member received in the inner cavity of the inner shell and a set of walls externally surrounding the outer shell.

These molds move along a closed path, whereon the following operations are carried out: shell loading, mold and associated shell heating, introduction of the foam ingredients or components into the gap between the shells and, following foam production, opening of the molds for removal of the formed cabinets and introduction of two new (inner and outer) shells, between which the foamed polyurethane insulation is to be provided.

The most widely used conventional molds comprise a set of movable walls, the movement of which is controlled by pneumatic mechanisms which, besides being of a substantial cost, require delicate and highly complex servicing and pipings. Of course, these factors adversely affect both costs and efficiency.

The object of the present invention is to provide a mold wherein the use of pneumatic mechanisms is not required, its operation being governed only by mechanical means and, in view that such an operation is fully automatic, the inventive mold allows not only a substantial reduction in labour, but also a constant output.

A mold according to the present invention is essentially characterized in that the portion male mold member is subjected to a raising and lowering movement as controlled by guides during the feeding step, while the outer portion of the mold, at least partly comprising swingable walls, travels on a substantially horizontal path.

Since by this approach the male mold member entirely projects from the inner shell after insulation forming, the removal of the foamed cabinet is of a great simplicity and without trouble for the operator, it being sufficient to this end to apply a thrust or traction on the cabinet without having to raise it at all.

According to an advantageous embodiment of the invention, the mold walls automatically close and open, and to this end posts are associated with the male portion, such posts cooperating with parts associated with the walls just to provide for closing and opening the mold and clamping it at closing position.

Figure 2:
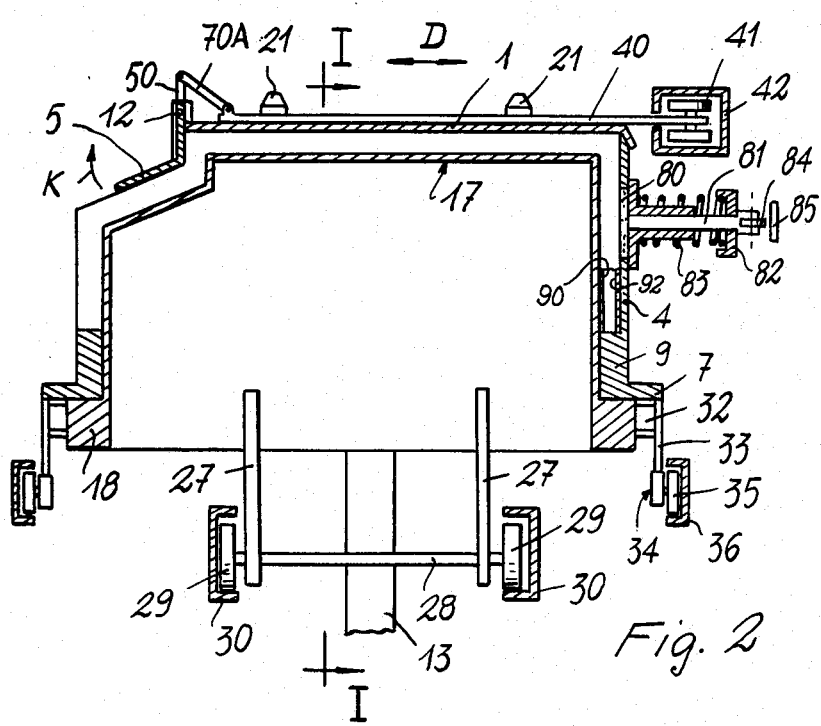
Figure 3:
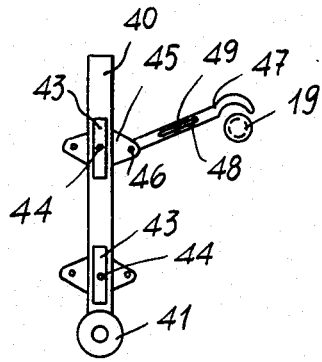

The invention will be better understood from the following detailed description, given by mere way of not limiting example, for a preferred embodiment thereof as shown in the accompanying drawings in which:

FIG. 1 schematically shows a mold of the invention according to a cross-sectional view taken substantially along line I—I of FIG. 2;

FIG. 2 is a longitudinal sectional view of the mold, taken substantially along line II—II of FIG. 1; and FIG. 3 is top view on a reduced scale, showing a latching system representing one of the possible approaches for clamping the mold walls to a closing position.

Referring to the above figures of the drawings, a mold according to the invention comprises a set of outer walls, and more particularly a top wall 1 fixedly connected at right angles to a side wall 2, a side wall 3 opposite said side wall 2, an end wall 4, and a partial end wall 5 opposite the end wall 4. The assembly of said walls 1 and 2 is hinged, such as at 6, to a plate or plate means 7 having a central opening 8 which is surrounded by a side board 9, while said wall 4 is fixedly connected to said plate 7, as clearly shown in FIG. 2. Wall 3 is hinged at 10 to plate 7, and more particularly to the side board 9 of the latter, while the partial wall 5 is hinged at 12 to one of the ends of the top wall 1.

A pulling rod 13 is fast with plate 7, this rod 13 being connected to and forming a moving means with a chain 14 designed to be driven in the direction of arrow A by any known driving means. A traction spring 15 is arranged between said plate 7 and wall 3 and is effective to cause said wall 3 to rotate about pin 10 in the direction of arrow B. A similar traction spring 16 is connected to wall 2, terminating on plate 7 and being effective to cause the assembly comprising said walls 1 and 2 to rotate in the direction of arrow C.

When the mold is closed, a male portion designated as a whole at 17 within the above mentioned walls enters through the opening 8, this male portion or member having a flanged element 18, the latter being rigidly joined with four upright posts 19 serving as guide means and drawing a closure. More particularly, two of these posts 19 are provided externally of wall 2 and the other two posts 19 externally of wall 3. These posts are of a cylindrical shape along the major length thereof and have at the top end thereof a groove 20 followed by a substantially frustoconical portion 21, which may be also spherical. These posts pass through suitable guide holes or bearings 22 in said plate 7, as well as suitable holes 23 provided at two side extensions 24 of the top wall 1.

A roller 25 is carried on wall 2 at each of said posts 19 outwardly facing thereto, said roller 25 engaging post 19. Similar rollers 26 are secured to wall 3.

The above mentioned male portion or member 17 carries through arms 27 a shaft 28, at the outer ends of which wheels 29 are mounted and run within guides 30 comprising sections which are preferably C-shaped.

By the configuration or development thereof, these guide means 30 are for enabling said male portion or member 17 to be lowered and raised or maintained at a given position because of being arranged in the aperture 8, so that it can be lowered and raised. The components 27-30 form a displacing means for displacing the inner mold means 17 through the opening in the plate means 7 between the illustrated inner molding position and an outer release position, this displacing means 27-30 responding to the movement of the inner mold means 17 together with the plate means 7 while the latter is moved by the moving means 13, 14 along the path determined by components 35, 36 to bring about displacement of the inner mold means between its outer release position and inner molding position.

Plate 7 is secured to beams 32 outwardly projecting, having arms 33 secured to the outer ends thereof, carrying carriages 34, the wheels 35 of which are guided by horizontal guide means or runways 36.

The top wall 1 carries a mechanical latching system comprising an axially sliding rod 40, at the end of which rollers 41 are provided as guided by guide means 42. These guide means operate as a cam by axially moving (see arrow D in FIG. 2) said rod 40. The rod 40 has a pair of longitudinal slits 43 (FIG. 3) which are passed through by pins 44 carried by the top wall 1. The rod has side projections 45, to which are hinged at 46 the ends of arms 47 with a hook-like termination at the free end thereof. These arms 47 have an elongated slit 48 accomodating therein a pin 49 secured to wall 1.

At clamping position, the hook-like ends of arms 47 will penetrate into the grooves 20 of posts 19, so that the outer walls of the mold are held firmly clamped to one another.

The sliding rod 40 may operate on a connecting rod 70A which is hinged to extensions 50 of said partial end wall 5, so that to hold the latter at close position, such as shown in FIG. 2. When rod 40 is moved, to the right as viewed in FIG. 2, so that its arms 47 will be clear of posts 19, said partial end wall 5 is automatically rotated about pin 12 in the direction shown by arrow K.

The operation of the described mold is as follows.

Assume that the mold is closed, as shown in FIG. 1, and the refrigerator cabinet under foaming is arranged within the gap 70 between the male mold member 17 which is received within the inner shell 90 (FIG. 2) and the outer mold walls (1, 2, 3, 4 and 5) which are situated at the exterior of the outer shell 92. The mold moves in the direction of arrow A as a result of the traction exerted by chain 14. Wheels 29, as accomodated in guides 30, enter a sloping down length of the guides, resulting in said male mold member 17 being gradually lowered (direction of arrow M). Prior to the starting of this downward movement, guides 42 have caused arms 47 to be cleared of posts 19 and as well wall 5 to rotate upwards. On lowering of male mold member 17, also posts 19 are lowered. When said posts have passed through the apertures 23 and the heads 21 thereof have moved below rollers 25, 26, walls 3 and assembly of walls 1, 2 can freely outwardly rotate (according to the directions of arrows B and C) under the influence of springs 15, 16. Upon the male mold member 17 reaching the bottom end of stroke, the refrigerator cabinet is free and, for instance, can be removed from the mold by an extractor being introduced into the bearing base of the refrigerator cabinet through the open side of the mold (or that side where the partial end wall 5 is located), or by a pusher arranged on wall 4 and comprising a pan-like member 80 connected to a stem 81 and provide with a contact head 82 having a compression spring 83 acting thereon. Said stem has a roller 84 and upon extraction or removal a cam surface 85 is effective thereon. After removal of the produced refrigerator cabinet, the outer and inner shells of a new refrigerator cabinet can be introduced. Then by way of the guides 30, the male portion of member 17 moves upwards and, as a result of this ascending movement, penetrates into the inner refrigerator shell, while on ascending said posts 19 cause side walls 1, 2 and 3 to approach and be clamped in place by means of the latching system shown in FIG. 3.

Thus, the process continues.

Thus, it will be seen that with the structure of the invention the inner mold means 17 is guided for movement in the opening of the plate means 7 which is defined by the endless portion 9 thereof. A moving means which is formed by the parts 13 and 14 is operatively connected with the plate means 7 to move the latter along the path determined by the components 35, 36. A displacing means, formed by components 27–30, is operatively connected with the inner mold means 17 to displace the latter through the opening in the plate means 7 between the illustrated inner molding position and an outer release position, this displacing means 27–30 responding to the movement of the inner mold means 17 with the plate means 7, while the latter is moved by the moving means 13, 14 along the path determined by components 35, 36, to bring about the displacing of the inner mold means between its outer release position and inner molding position. The walls 1–5 form an outer mold means carried by the plate means 7 and defining a space which receives the inner mold means when the latter is in its inner molding position illustrated in the drawings. The walls of the outer mold means are swingably connected to the plate means 7 for movement with respect thereto between the closed position illustrated in the drawings and an open position where the container shells 90, 92 and the foam plastic therebetween is released for separation from the mold, as described above. The posts 19 operatively connected with the inner mold means 17 form an automatic means for automatically swinging the walls of the outer mold means from their open to their closed position in response to movement of the inner mold means from its outer release position to its inner molding position, this automatic means 19 cooperating with the rollers 25 and 26 as described above for this purpose. This automatic movement of the outer mold means to its closed position takes place in opposition to the spring means 15, 16 which urges the outer mold means to its open position. The structure shown in FIG. 3 forms a latch means which cooperates with the grooves 20 of the posts 19 for releasably holding the outer mold means in its closed position. This latch means cooperates through the link 70A with the end wall 5 of the outer mold means to swing the latter to an open position with respect to the top wall 1 of the outer mold means as described above. In a manner which is known, after a pair of shells 90, 92 with the foam plastic therebetween has been removed, the next pair of shells 90 and 92 are placed on the top edge of the endless wall 9 which defines the opening of the plate 7, and the inner mold means 17 then returns to its inner molding position, automatically providing by way of the posts 19 and the rollers 25, 26 the return of the outer mold means to its closed position, so that in this way the inner mold means 17 is received within the inner shell 90 while the outer mold means surrounds and engages the outer shell 92, thus maintaining these shells properly situated with respect to each other to receive the foam plastic.

Although only one embodiment of the invention has been described, those skilled in the art will readily devise many changes and modifications, all of which are however to be intended as within the scope of the invention.

I claim:

1. In a mold for holding a pair of container shells while a foam plastic is received therebetween, plate means formed with an opening, inner mold means situated in said opening, moving means operatively connected to said plate means for moving the latter together with said inner mold means along a predetermined path, displacing means operatively connected with said inner mold means for responding to movement of the latter with said plate means to diplace said inner mold means through said opening of said plate means between an outer release position and an inner molding position, where said inner mold means is received in the interior of an inner container shell, outer mold means carried by said plate means for movement with respect thereto between a closed position surrounding an outer container shell to hold the latter properly positioned with respect to an inner shell which receives said inner mold means and an open position releasing the container shells and a foam plastic therebetween for separation from the mold, and automatic means operatively connected with said inner mold means and engaging said outer mold means for responding to movement of said inner mold means from said outer release position to said inner molding position thereof to automatically move said outer mold means from its open position to its closed position, said automatic means including posts operatively connected with said inner mold means for movement therewith and said outer mold means including walls swingably connected with said plate means and acted upon by said posts to be moved thereby from said open to said closed position.

2. The combination of claim 1 and wherein said walls carry rollers which engage said posts.

3. The combination of claim 1 and wherein a spring means is operatively connected with said walls for urging the latter to said open position.

4. The combination of claim 1 and wherein one of said walls of said outer mold means has extensions formed with openings through which said posts respectively extend when said inner mold means is in its inner molding position, and latch means cooperating with said posts when they extend through said openings of said extensions for releasably holding said outer mold means in its closed position.

5. The combination of claim 4 and wherein said posts are respectively formed with grooves situated at one side of said extensions when said inner mold means is in its inner molding position, and said latch means including latch members which are received in said grooves when said latch means is in its position releasably holding said outer mold means in its closed position.

6. The combination of claim 5 and wherein said latch means is carried by said wall which has said extensions, a second wall of said outer mold means being swingable connected to said wall which has said extensions and linkage means connecting said latch means to said second wall for swinging the latter to an open position when said latch means is moved to a position releasing said outer mold means for movement to its open position.

* * * * *